United States Patent [19]

Lucas et al.

[11] Patent Number: 4,753,926

[45] Date of Patent: Jun. 28, 1988

[54] INFANT FOODS

[75] Inventors: Alan Lucas, Cambridge; Richard I. Barr, Plymouth, both of England

[73] Assignee: Farley Health Products Limited, England

[21] Appl. No.: 48,547

[22] Filed: May 11, 1987

Related U.S. Application Data

[63] Continuation of Ser. No. 858,757, May 2, 1986, abandoned, which is a continuation of Ser. No. 621,664, Jun. 18, 1984, abandoned.

[30] Foreign Application Priority Data

Jun. 16, 1983 [GB] United Kingdom ................ 8316458
Jun. 23, 1983 [GB] United Kingdom ................ 8317073

[51] Int. Cl.$^4$ ............................................. A61K 31/40
[52] U.S. Cl. ........................................ 514/2; 514/23; 514/127; 514/251; 514/558; 426/2; 426/72; 426/74; 426/801
[58] Field of Search ...................... 426/2, 72, 74, 656, 426/801; 514/2, 23, 127, 251, 558

[56] References Cited

U.S. PATENT DOCUMENTS

| | | | |
|---|---|---|---|
| 2,659,676 | 11/1953 | Howard et al. | 426/72 |
| 3,542,560 | 11/1970 | Tomarelli et al. | 426/585 |
| 3,649,295 | 3/1972 | Bernhart | 426/601 |
| 3,896,240 | 7/1975 | Gruette et al. | 426/72 |
| 4,216,236 | 8/1980 | Mueller et al. | 426/72 |
| 4,282,265 | 8/1981 | Theuer | 426/607 |
| 4,303,692 | 12/1981 | Gaull | 426/2 |
| 4,368,204 | 1/1983 | Sato et al. | 514/2 |
| 4,497,800 | 2/1985 | Larson et al. | 514/2 |

FOREIGN PATENT DOCUMENTS

| | | |
|---|---|---|
| 84304038 | 3/1986 | European Pat. Off. . |
| 979822 | 12/1965 | France . |

OTHER PUBLICATIONS

D. S. Gromisch et al., The Journal of Pediatrics, 1977, 90,118–122.
K. L. Tan et al., The Journal of Pediatrics, 1978, 93, 494–497.
A. E. Bender, Chemical Publishing, 1968, 58–73, 208–211.
Lucas et al., "Transiet Riboflavin Depeletion in Preterm Infants" Arch Dis Child (England) Sep. 1984, pp. 837–841.
Dunbar et al., "Automated Fluorometric Determination of Thiamine & Riboflavin in Infant Formulas" J. Assn. Off. Aval Chem. 1979, pp. 642–647.
Martindale-The Extra Pharmacopoeias, 27th Ed., 1977, pp. 1696–1697.
Merck Index, 9th Ed. 1976, 7993, Riboflavine.
L. Hove et al., Acta Paediatr, Scan., 1979, 68, 567–570.
Osterprem, The Formula Specially Designed for Low Birthweight Infants.
Osterprem-A Specialised Low Birthweight Infant Formula Handbook for Paediatric Use.
Dictionaire Vidal 1974, 1978 and 1982.

Primary Examiner—R. B. Penland
Attorney, Agent, or Firm—Jacobs & Jacobs

[57] ABSTRACT

Infant foods suitable for use in the feeding of low birthweight infants, more especially preterm infants, are disclosed. The foods contain a relatively high level of vitamin $B_2$ and may be prepared so as to have an opacity greater than that of human breast milk leading to less susceptibility of the vitamin $B_2$ to breakdown by UV-light when used for the feeding of low birthweight infants who are receiving phototherapy. Preferred infant foods according to the invention also have high contents of vitamin $B_6$, vitamin C, vitamin D, vitamin E, folic acid, copper and zinc while containing no added iron. Another aspect of the invention is the inclusion of taurine and carnitine. One unexpected property of the infant foods according to the invention with high vitamin content is that their use has been found to reduce the incidence of hyperbilirubinaemia in low birthweight infants.

32 Claims, No Drawings

INFANT FOODS

CROSS-REFERENCE

This is a continuation of Ser. No. 858,757, filed May 2, 1986, now abandoned, which is a continuation of Ser. No. 621,664, filed Jun. 18, 1984, now abandoned.

This invention relates to an infant food, to a process for its preparation and to its use for the nourishment of infants. The invention is particularly concerned with infant foods suitable for use in the feeding of low birthweight infants and more especially preterm infants.

The survival rate of low birthweight infants, particularly preterm infants and more especially tiny, very immature preterm infants, has increased dramatically in recent years. The nutritional requirements of low birthweight infants such as preterm infants are unique and are not satisfied by feeding the infants with human breast milk or infant foods formulated with the needs of normal birthweight infants in mind. It is now appreciated that it may be desirable for low birthweight infants to be fed with infant foods which are specially formulated to meet their nutritional requirements, without imposing stress, as regards protein, fat, carbohydrate, vitamins, minerals, trace elements, etc.

Vitamins which are usual ingredients of infant foods for low birthweight infants include vitamin $B_2$, vitamin $B_6$, vitamin C, vitamin D, vitamin E and folic acid. Thus, for example, proprietary infant foods which are currently marketed for use in feeding low birthweight infants are believed to contain these vitamins in the following amounts:

TABLE 1

|  | $B_2$* | $B_6$* | C** | D* | E** | Folic* Acid |
|---|---|---|---|---|---|---|
| NENATAL (Cow & Gate) | 150 | 70 | 12 | 3 | 4 | 13 |
| PREAPTAMIL (Milupa) | 100 | 100 | 12.5 | 1.1 | 1.25 | 12.5 |
| PREMATALAC (Cow & Gate) | 100 | 80 | 6.5 | 1.1 | 1.0 | 3.5 |
| SMA LOW BIRTHWEIGHT (Wyeth) | 130 | 50 | 7.0 | 1.3 | 1.5 | 10 |
| ENFAMIL PREMATURE (Mead Johnson) | 74 | 53 | 6.9 | 1.3 | 1.6 | 24 |
| SIMILAC 24 LBW (Ross Abbott) | 120 | 50 | 10 | 1.2 | 1.8 | 10 |
| ALPREM (Nestle) | 60 | 40 | 11 | 1.8 | 1.4 | 11 |

*Amounts given in μg per 100 ml for Vitamins $B_2$, $B_6$, D and Folic Acid.
**Amounts given in mg per 100 ml for Vitamins C and E As will be seen, there are significant variations in the amounts of the above-mentioned vitamins which are present in the proprietary infant foods which are currently marketed.

As regards one of the vitamins referred to in Table 1, namely vitamin $B_2$, it is understood that this vitamin plays a central role in intermediary metabolism and energy release and that it is important that vitamin $B_2$ deficiency in low birthweight infants should be avoided. Studies which have now been carried out suggest that the amounts of vitamin $B_2$ which have hitherto been incorporated in low birthweight infant foods may be too little to avoid the risk of vitamin $B_2$ deficiency occurring in a substantial number of cases, especially where, as is commonly so, the infants are being subjected to phototherapy as a treatment for neonatal jaundice. It has thus been observed that substantial degradation of vitamin $B_2$ can occur upon exposure of infant foods to standard phototherapy illumination under conditions similar to those encountered in hospital wards. Infants who receive phototherapy whilst being fed from transparent or translucent feeding containers and/or through transparent or translucent tubing may thus be at special risk of developing vitamin $B_2$ deficiency.

It is one object of the present invention to provide a food for low birthweight infants which reduces the risk of infants developing vitamin $B_2$ deficiency, particularly in the above-mentioned circumstances.

Trace elements which are usual ingredients of low birthweight infant foods include copper, zinc and iron. The above-mentioned currently marketed proprietary infant foods contain these trace elements in the following amounts:

TABLE 2

|  | Copper | Zinc | Iron |
|---|---|---|---|
| NENATAL | 80 | 800 | 800 |
| PREAPTAMIL | 10 | 100 | 700 |
| PREMATALAC | 50 | 400 | 650 |
| SMA LOW BIRTHWEIGHT | 70 | 500 | 670 |
| ENFAMIL PREMATURE | 74 | 814 | 127 |
| SIMILAC 24 LBW | 80 | 810 | 324 |
| ALPREM | 60 | 500 | 800 |

All Quantities in μg/100 ml

Again it will be noted that there are significant variations in the amounts of the trace elements which are present.

Copper is a component of several enzyme systems and is required for normal iron metabolism and connective tissue formation. Zinc forms part of many metalloenzymes and is fundamental to growth because it is required for cell replication. Whilst symptomatic copper and zinc deficiencies are only infrequently reported, it is believed that unrecognised subclinical deficiencies may be not uncommon and that there are risks of such deficiencies developing in the low birthweight infants fed with infant foods having copper and zinc contents as listed in Table 2.

It is a further object of the present invention to provide a food for low birthweight infants which reduces the risk of the infants developing copper and/or zinc deficiencies.

Iron is another trace element which is usually included in infant food formulations for low birthweight infants (see Table 2). Iron is required for the synthesis of haemoglobin, myoglobin and iron-containing enzymes as well as for maintaining iron stores. In view of the fact that iron stores are usually adequate at birth and that iron supplementation can have certain disadvantages, for example by possibly contributing to iron overload in preterm infants receiving transfusions and/or increasing the risk of infection, we believe that it is advantageous to exclude iron as an added ingredient of infant foods for low birthweight infants and more especially for preterm infants.

While it is common to administer particular vitamins, minerals, trace elements, etc. to supplement the diet provided by available proprietary infant foods, it is desirable that such infant foods should be formulated to satisfy as completely as possible the needs of the infant in order to avoid the risk of undetected deficiencies occuring. Two ingredients which are not present in the above-mentioned proprietary infant foods are taurine and carnitine and we belive that infant foods for low birthweight infants should desirably contain both these ingredients. Taurine is involved in many processes including cell membrane function and bile acid conjugation and, since the immature infant's ability to synthesise this amino acid is limited, an external supply of taurine is thought to be desirable, particularly for preterm infants. Carnitine facilitates the transport of free fatty acids across the mitochondrial membrane and hence plays a role in fatty acid oxidation and ketogenesis.

It is thus a still further object of the present invention to provide an infant food for low birthweight infants and particularly for preterm infants which is adapted to satisfy the dietary needs of the infant without supplementation. It will of course be appreciated that, whilst the infant food products of the invention are adapted to provide a complete diet for the infant, deficiencies may still occur in which case dietary supplements will need to be administered as and when such deficiencies are detected. We do however believer that the infant food products of the invention have an advantage over existing proprietary infant foods in minimising the occurrence of such deficiencies.

The condition of hyperbilirubinaemia is quite commonly encounted in low birthweight infants and more particularly in preterm infants. This condition may give rise to severe jaundice and brain damage, and is usually treated by phototherapy and/or blood transfusions.

It is a yet still further object of the present invention to provide an ifant food the use of which reduces the incidence of hyperbilirubinaemia in low birthweight infants.

According to one aspect of the present invention, there is provided an infant food for use in the feeding of low birthweight infants which is in the form of an artificial milk comprising protein, fat, carbohydrate, vitamins, minerals and trace elements, the said food containing at least 160 µg of vitamin $B_2$ per 100 ml.

It will be noted that the vitamin $B_2$ content of the infant foods of the invention is higher than that of the proprietary infant foods referred to in Table 1 above. Because of the hitherto unappreciated susceptibility of vitamin $B_2$ to degradation when in transparent or translucent feeding containers and/or passing through transparent or translucent tubing exposed to phototherapy illumination, even when the length of time for which the vitamin $B_2$-containing infant food is exposed to the phototherapy illumination is quite short, it is believed that the amounts of vitamin $B_2$ hitherto included in infant foods for low birthweight infants has been insufficient to avoid the frequent occurrence of vitamin $B_2$ deficiency particularly in infants who are being treated by phototherapy. The amount of vitamin $B_2$ present in the infant foods of the invention is preferably from 160 to 300 µg per 100 ml.

According to a particularly preferred feature of the present invention, the infant food not only contains at least 160 µg, preferably 160 to 300 µg, of vitamin $B_2$ per 100 ml but also has an opacity greater than that of human breast milk whereby the vitamin $B_2$ is protected from degradation when in transparent of translucent feeding containers and/or passing through transparent or translucent tubing whilst exposed to the action of UV light as used in phototherapy for the treatment of neonatal jaundice. A high content of calcium contributes to high opacity and the infant foods of the invention preferably contain an amount of calcium per 100 ml within the range of from 50 to 80 mg, advantageously about 70 mg which is about the maximum amount of calcium which can conveniently be maintained in solution in 100 ml of the infant food. Sterilisation also increases opacity and the infant foods of the invention are advantageously in the form of ready to use sterilised liquids.

The infant foods of the invention also preferably contain vitamin $B_6$, vitamin C, vitamin D, vitamin E and folic acid in the following amounts:

TABLE 3

|  | Preferred minimum amount (per 100 ml) | Preferred range (per 100 ml) |
|---|---|---|
| Vitamin $B_6$ | 85 µg | 85–160 µg |
| Vitamin C | 20 mg | 20–60 mg |
| Vitamin D | 6 µg | 6–12 µg |
| Vitamin E | 8 mg | 8–16 mg |
| Folic acid | 40 µg | 40–150 µg |

It will be noted that these preferred amounts are very significantly higher than are for most part used in the proprietary infant foods referred to in Table 1 and that none of such proprietary infant foods has the combination of high vitamin contents which is a preferred feature of the present invention. Contrary to previous thinking as evidenced by the known proprietary infant foods, it is believed that the preferred vitamin contents as set out in Table 3 provide intakes as near as possible to the optimum required by low birthweight infants and that accordingly infant foods according to the invention having such preferred vitamin contents are best suited to satisfy the dietary requirements of low birthweight infants and more particularly preterm infants as regards intake of the vitamins concerned.

Furthermore, whilst there has hitherto been some concern about the danger of toxic effects arising from the intake of too large quantities of, for example, vitamin D and E, we have established that the higher quantities of these vitamins which are preferably present in the infant foods according to the invention are entirely safe as well as being beneficial for low birthweight infants.

The functions of the above-mentioned vitamins are believed to be as follows:

Vitamin $B_6$

Pyridoxine, and metabolically and functionally related compounds, are sources of coenzymes primarily required for the metabolism of amino acids and are hence particularly important for anabolism. Since anabolic requirements of the low birthweight infant and more particularly the preterm infant are believed to be very high it is thought to be advantageous to utilise relatively high amounts of vitamin $B_6$ in the infant foods of the invention.

Vitamin C

Ascorbic acid is required for the formation and maintenance of connective tissue and is inter alia involved in the metabolism of tyrosine. Low birthweight infants and more particularly preterm infants have a reduced ability to metabolise tyrosine efficiently. It is believed that vitamin C in amounts well above those utilised in the known proprietary infant foods may be effective in preventing hypertyrosinaemia.

Vitamin D

Vitamin D, in conjunction with endocrinal controls, palys a key role in the metabolism of calcium and phosphorus. Hypocalcaemia, hypophosphataemia, raised alkaline phosphatase and radiological evidence of rickets have been observed in preterm babies. It is believed that the utilisation of higher amounts of vitamin D than in the known proprietary infant foods will be advantageous in reducing the incidence of these conditions.

Vitamin E

Vitamin E is a natural antioxidant which protects cell membranes from peroxidation. Haemolytic anaemia and oedema resulting from vitam E deficiency has been reported. It is believed that the utilisation of higher amounts of vitamin E than in the known proprietary infant foods will be advantageous in reducing the incidence of these conditions.

Folic acid

Coenzymes containing folic acid are required for nucleic acid synthesis and amino acid metabolism. Cell division therefore depends upon an adequate supply of folate. Frank deficiency in the preterm infant is manifested by megaloblastic anaemic. There is also evidence that growth rates are reduced and speculation that mental development may be impaired by folic acid deficiency. It is believed that the utilisation of higher amounts of folic acid than in the known proprietary infant foods will be advantageous in reducing the incidence of these conditions.

The infant foods according to the invention will also conveniently contain vitamins A, $B_1$, $B_{12}$ and K, niacinamide, pantothenic acid and biotin, preferably in the following amounts:

TABLE 4

|  | Preferred minimum amount (per 100 ml) | Preferred range (per 100 ml) |
|---|---|---|
| Vitamin A | 80 μg | 80–160 μg |
| Vitamin $B_1$ | 80 μg | 80–200 μg |
| Vitamin $B_{12}$ | 0.1 μg | 0.1–0.7 μg |
| Vitamin K | 5 μg | 5–10 μg |
| Niacinamide | 0.8 mg | 0.8–2.0 mg |
| Pantothenic acid | 400 μg | 400–800 μg |
| Biotin | 1 μg | 1–4 μg |

The infant foods according to the invention preferably contain the trace elements copper and zinc in the following amounts:

TABLE 5

|  | Preferred minimum amount (per 100 ml) | Preferred range (per 100 ml) |
|---|---|---|
| Copper | 85 μg | 85–160 μg |
| Zinc | 820 μg | 820–1200 μg |

It will be noted by comparing Tables 2 and 5 that copper and zinc are incorporated in higher amounts than are present in the proprietary infant foods referred to in Table 2. It is believed that such higher amounts are desirable to avoid the risk of low birthweight infants developing copper and/or zinc deficiencies, particularly subclinical deficiencies which are difficult or impossible to diagnose. It has been observed that the bioavailability of zinc from artificial milk products is inferior to that from human breast milk and the higher amount of zinc also serves to compensate for this.

Other trace elements which may be present in the infant foods according to the invention are manganese and iodine. They may for example be incorporated in the amounts of about 3 μg manganese and about 7 μg iodine per 100 ml.

The infant foods according to the invention preferably contain no added iron for the reasons hereinbefore explained. Such infant foods will nonetheless have a natural iron level which will vary according to the formulation and which in particularly preferred infant foods according to the invention has been found to be about 40 μg per 100 ml. It will be noted from Table 2 that this is very substantially less than the proprietary formulations referred to therein, all of which contain added iron.

Taurine and carnitine are further preferred ingredients of the infant foods according to the invention. Taurine is with advantage present in an amount of at least 2.5 mg, particularly 2.5 to 10 mg, per 100 ml. Carnitine is with advantage present in an amount of at least 1 mg, particularly 1 to 5 mg, per 100 ml.

One preferred infant food according to the present invention thus contains at least 6 μg of vitamin D, 8 mg of vitamin E, 80 μg of vitamin $B_1$, 85 μg of vitamin $B_6$, 20 mg of vitamin C, 40 μg of folic acid, 820 μg of zinc, 85 μg of copper, 2.5 mg of taurine and 1 mg of carnitine per 100 ml.

One particularly preferred infant food according to the present invention contains from 6 to 12 μg of vitamin D, 8 to 16 mg of vitamin E, 80 to 200 μg of vitamin $B_1$, 160 to 300 μg of vitamin $B_2$, 85 to 160 μg of vitamin $B_6$, 20 to 60 mg of vitamin C, 40 to 150 μg of folic acid, 820 to 1200 μg of zinc, 85 to 160 μg of copper, 2.5 to 10 mg of taurine and 1 to 5 mg of carnitine per 100 ml.

The infant foods according to the invention are desirably formulated to satisfy the dietary requirements of the low birthweight infant and more especially the preterm infant as regards energy, protein, fat and carbohydrate. The infant foods according to the present invention thus preferably provide 65 to 85 kcal of energy and contain 1.4 to 3.0 g of protein, 4.0 to 5.5 g of fat and 6.0 to 9.0 g of carbohydrate per 100 ml. The protein, fat and carbohydrate all contribute to the provision of the energy, advantageously in the ratio of protein:fat:carbohydrate of about 10:55:35.

The protein will in general be whole milk protein, whey protein or any other suitable protein, for example soya. The quality of the protein used is of importance and preterm babies in general grow better and are less metabolically stressed when fed diets in which the amino acid pattern is similar to that of mature human breast milk. An amino acid pattern similar to that of mature human breast milk can for example be obtained by mixing demineralised whey with intact milk protein. Where whey protein is used, it will conveniently provide not less than 60% of the total protein content of the food.

The fat content provides a proportion of the energy requirement, supplies essential fatty acids (EFA) and aids the absorption of fat-soluble vitamins. Fat utilisation is less efficient in low birthweight infants, particularly preterm infants, because of immature digestive processes. Although human milk fat is relatively well absorbed, it is very difficult in practice to simulate using available sources of edible fats and oils. The fat blend which is preferably used in the infant foods according to the present invention should be one which is efficiently utilised in a normal physiological manner. Fat digestion and absorption improve as fatty acid chain length decreases, the degree of unsaturation increases and the proportion of long chain saturated fatty acids such as palmitic acid in the outer positions of the triglyceride molecule diminishes. On physiological grounds, it is preferable to replace poorly absorbed long chain saturated fatty acids with a combination of mono- and polyunsaturated fatty acids as in human breast milk and it has been found that this can be done in such a way as to ensure good fat absorption without providing excessive imbalances of individual fatty acids.

The carbohydrate content makes an important contribution to the energy requirement, the preferred carbohydrate for use being lactose. The infant foods according to the invention also preferably contain a small amount (relative to lactose) of a glucose donor such as maltodextrin. It has been found that, for example, maltodextrin improves the tolerance of the infant food by helping to make the osmolarity similar to body fluids and by increasing the margin of tolerance for lactose. The ratio of lactose:maltodextrin is with advantage from 5:1 to 9:1 by weight, advantageously about 6:1 by weight.

As regards mineral content, in addition to calcium as discussed above, the infant foods according to the invention preferably contain sodium, chloride and phosphorus in the following amounts:

TABLE 6

| | Preferred minimum amount (per 100 ml) | Preferred range (per 100 ml) |
| --- | --- | --- |
| Sodium | 20 mg | 20–60 mg |
| Chloride | 40 mg | 40–85 mg |
| Phosphorus | 25 mg | 25–40 mg |

Other mineral ingredients which may be present include for example potassium and magnesium.

The above-mentioned minerals perform a wide range of important biological functions and it is believed that the preferred amounts as defined above are the most appropriate for satisfying the nutritional requirements of low birthweight infants and more especially of preterm infants.

An especially preferred infant food according to the invention provides 65 to 85 kcal of energy and contains 1.4 to 3.0 g of protein, 4.0 to 5.5 g of fat, 6.0 to 9.0 g of carbohydrate, 80 to 160 μg of vitamin A, 6 to 12 μg of vitamin D, 8 to 16 mg of vitamin E, 5 to 10 μg of vitamin K, 80 to 200 μg of vitamin $B_1$, 160 to 300 μg of vitamin $B_2$, 85 to 160 μg of vitamin $B_6$, 0.1 to 0.7 μg of vitamin $B_{12}$, 0.8 to 2.0 mg of niacinamide, 40 to 150 μg of folic acid, 400 to 800 μg of pantothenic acid, 1 to 4 μg of biotin, 20 to 60 mg of vitamin C, 20 to 60 mg of sodium, 40 to 85 mg of chloride, 50 to 80 mg of calcium, 25 to 40 mg of phosphorus, 820 to 1200 μg of zinc, 85 to 160 μg of copper, 2.5 to 10.0 mg taurine and 1 to 5 mg of carnitine per 100 ml of product.

For example, 100 ml of an infant food according to the invention may with advantage provide from 75 to 85, for example 80 kcal, of energy, and contain protein - 1.7 to 2.2 g, for example 2.0 g; fat - 4.5 to 5.2 g, for example 4.9 g; carbohydrate - 6.5 to 8.0 g, for example 7.0 g; vitamin A - 95 to 160 μg, for example 100 μg; vitamin D - 6 to 10 μg, for example 8 μg; vitamin E - 10 to 12 mg, for example 10 mg; vitamin K - 5 to 8 μg, for example 7 μg; vitamin $B_1$ - 90 to 170 μg, for example 95 μg; vitamin $B_2$ - 170 to 230 μg, for example 180 μg; vitamin $B_6$ 90 to 160 μg, for example 100 μg; vitamin $B_{12}$ - 0.2 to 0.7 μg, for example 0.2 μg; niacinamide - 1.0 to 1.4 mg, for example 1.0 mg; folic acid - 50 to 150 μg, for example 50 μg; biotin - 2.0 to 4.0 μg, for example 2.0 μg; vitamin C - 20 to 40 mg, for example 28 mg; sodium - 25 to 50 mg, for example 45 mg; chloride - 45 to 65 mg, for example 60 mg; calcium - 55–80 mg, for example 70 mg; phosphorus - 27 to 40 mg, for example 35 mg; zinc - 900 to 1200 μg, for example 1000 μg; copper - 100 to 160 μg; for example 120 μg; taurine - 4 to 10.0 mg for example 5.1 mg; and carnitine - 1 to 4 mg, for example 1 or 2 mg.

A food according to the invention which we have found to be of particular value is an artificial milk characterised in that it provides 80 kcal of energy and contain 2.0 g of protein (comprising 1.227 g of whey protein and 0.773 g of casein), 4.9 g of fat, 7.0 g of carbohydrate (comprising 6.0 g of lactose and 1.0 g of maltodextrin) 100 μg of vitamin A, 8 μg of vitamin D, 10 mg of vitamin E, 7 μg of vitamin K, 95 μg of vitamin $B_1$, 180 μg of vitamin $B_2$, 100 μg of vitamin $B_6$, 0.2 μg of vitamin $B_{12}$, 1000 μg of niacinamide, 50 μg of folic acid, 500 μg of pantothenic acid, 2.0 μg of biotin, 28 mg of vitamin C, 45 mg of sodium, 60 mg of chloride, 70 mg of calcium, 35 mg of phosphorus, 1000 μg of zinc, 120 μg of copper, 5.1 mg of taurine and 1 mg of carnitine per 100 ml.

One unexpected property of the infant foods according to the invention with high vitamin contents as hereinbefore described is that their use has been found to reduce the incidence of hyperbilirubinaemia in low birthweight infants. It is not known whether this property is attributable to one particular ingredient or to two or more of the ingredients of the infant food acting together, although it is believed that the presence of vitamin E may at least in part be responsible.

The infant foods according to the invention are for use in the nourishment of infants, in particular low birthweight infants and more especially preterm infants, and can be used with particular advantage for the nourishment of both healthy and sick infants of 2.5 kg birthweight or less. We have found that the infant foods according to the invention are especially suitable for the nourishment of very low birthweight infants, for example, such infants having a birthweight of 1850 g or less and more particularly a birthweight of 1200 g or less.

The infant foods according to the invention may conveniently be in ready-to-use, sterilised liquid form, in the form of a reconstitutable liquid concentrate or in solid form.

According to a further aspect of the present invention there is provided an infant food in the form of a concentrate which is adapted upon dilution to provide an infant food according to the invention as hereinbefore defined. Such concentrates can conveniently be prepared by concentration infant foods according to the invention as hereinbefore defined, e.g. by evaporation.

According to a still further aspect of the present invention, there is provided an infant food in solid form, e.g. as a powder, which is adapted upon addition of water to provide an infant food according to the invention as hereinbefore defined. Such infant foods in solid form can conveniently be prepared by drying liquid infant foods according to the invention as hereinbefore defined, e.g. by evaporation and spray-drying.

The infant foods according to the invention are conveniently provided in suitable containers such as for example glass or plastic bottles, in which a convenient quantity of the food may be presented. When in the form of concentrates or in solid form, they can be reconstituted in an appropriate volume of sterile water before use. The invention further provides an infant food according to the invention as hereinbefore defined in a container in association with instructions for its reconstitution and/or its use in the nourishment of low birthweight infants and particularly preterm infants as hereinbefore referred to.

The infant foods according to the invention may be used as the sole source of nourishment for the infant, or may be used to supplement mother's own or banked breast milk or standard infant formulations. In another aspect, the food may be used for partial enteral feeding, in conjunction with partial parenteral feeding. The infant foods may be fed by any appropriate method but in general will be fed enterally, e.g. orally, nasojejunally or by nasogastric tube.

A proposed enteral feeding regime when feeding is fully established is 150 to 200 ml per kg of body weight per day, for example 180 ml/kg/day. It will be appreciated, however, that the precise daily feed will depend on the condition of the infant and the route of feeding chosen. The food may also need to be introduced to the infant in a smaller quantity at the start of the feeding and increased thereafter until full feeding established.

The infant foods according to the invention may be prepared in any convenient way, for example by the general process described below. For convenience this process has been described as comprising various stages and it will be appreciated that the order of these stages may in some cases be varied whilst still providing an infant food according to the invention as product. The stages of the process are:

Stage 1 Clarified pasteurised whole milk is standardised by the addition of whey protein concentrate;

Stage 2 The Stage 1 mixture is further standarised by the addition of carbohydrate.

Stage 3 Vegetable oil, emulsifiers and oil-soluble vitamins are added to the Stage 2 mixture;

Stage 4 The Stage 3 mixture is clarified, then pasteurised, homogenised and chilled;

Stage 5 Water-soluble vitamins, taurine and carnitine are added to the Stage 4 mixture;

Stage 6 Minerals and trace elements are added to the Stage 5 mixture;

Stage 7 The Stage 6 mixture is filtered, filled into an appropriate container and sterilised.

The final product is an infant food according to the invention in the form of a sterile liquid feed. Where for example a product in powder form is desired, it may be obtained by drying the liquid by any convenient method such as by evaporation and spray-drying, for example at Stage 6 of the general process described above.

If desired, clarified skimmed milk may be used in place of the whole milk in Stage 1 of the process.

The whey protein concentrate in Stage 1 may be a liquid concentrate or may be obtained by conventional means, for example by mixing the required quantity in water at 20° to 60° C., preferably 20° C., until solution is complete, and allowing hydration to occur over a period of at least 30 minutes.

The carbohydrate added in Stage 2 may for example be a solution of lactose in water and a solution of a glucose donor such as maltodextrin in water. It may be necessary in each case to warm the solution to ensure the carbohydrate is completely dissolved.

Examples of the vegetable oil added in Stage 3 are groundnut oil, palm kernel oil or palm oil and may for example be a mixture of two or more oils. The emulsifiers added at Stage 3 may be for example glyceryl monostearate or lecithin. Conveniently, the emulsifiers are dissolved in the vegetable oil, but alternatively they may be dispersed in the Stage 2 mixture before the vegetable oil is added. The oil-soluble vitamins added at Stage 3 are vitamins A, D, E and K. In accordance with conventional practice it may be necessary to add an antioxidant at this stage, for example d,1-$\alpha$-tocopherol. The vitamins are added to the vegetable oil, and the resulting vitaminised oil, optionally containing emulsifiers, then added to the Stage 2 mixture. To ensure a uniform mixture is obtained at this stage it is convenient to follow the addition of the oil with sufficient agitation to obtain an emulsion and then to homogenise, for example at a temperature of about 40° C. and a pressure of about 70 bar.

In Stage 4 of the process, clarification, pasteurisation, homogenisation and chilling may be performed in accordance with conventional practice. For example, pasteurisation may be at a temperature of 78° C. for 15 seconds; homogenisation may be effected at a temperature of 73° C. and a pressure of about 200 bar; chilling may be to a temperature of 3° C.

The water soluble vitamins added at Stage 5 of the process are vitamins $B_1$, $B_2$, $B_{12}$ and C, niacinamide, pantothenic acid, folic acid and biotin. The vitamins, taurine and carnitine are conveniently premixed before addition to the Stage 4 mixture.

The minerals and trace elements added at Stage 6 of the process are calcium, sodium, chloride, phosphorus, copper and zinc and are for the most part conveniently added as salts thereof such as for example calcium chloride, calcium lactate, zinc sulphate and copper sulphate. Potassium and magnesium may also be added at this stage. Sodium is conveniently added as sodium hydroxide.

In Stage 7 of the process the standardsised mix may be filled into any suitable container, which may be sealed as appropriate. For example glass bottles may be used which may be sealed by steam closure after addition of the feed. Sterilisation may be effected at an $F_o$ value between 5.0 and 9.0, for example 7.5.

The following Example illustrates the invention. All temperatures are in ° C. The oily vitamin concentrate and the water soluble vitamin mixture referred to in the Example contain the following ingredients in sufficient quantities to give the levels of the appropriate vitamins, carnitine and taurine as shown in Table 7.

Oily vitamin concentrate

Vitamin A acetate, calciferol (vitamin D), d,1-$\alpha$-tocopherol acetate (vitamin E), and phytomenadione (vitamin $K_1$).

Water soluble vitamin mixture

Thiamine HCl (vitamin $B_1$), riboflavin (vitamin $B_2$), pyridoxine HCl (vitamin $B_6$), cyanocobalamin (vitamin $B_{12}$), folic acid, niacinamide, calcium-d-pantothenate, d-biotin, sodium ascorbate, carnitine HCl and taurine.

EXAMPLE

Approximately 1375 kg clarified, pasteurised whole milk, containing 44 kg protein, is standarised by the addition of 80 kg ultrafiltered whey protein concentrate containing 44 kg protein. Before addition to the whole milk the whey protein concentrate is dissolved in 480 kg water at 20°, using a high speed mixer, and allowed to hydrate for 30 minutes.

The mixture of whole milk and whey protein concentrate is further standarised by the addition of 189 kg lactose monohydrate, 46 kg maltodextrin, 150 kg mixed vegetable oils (groundnut oil; palm kernel oil 78:22 w/w), 7 kg glyceryl monostearate, 2 kg lecithin and 2 kg oil vitamin concentrate.

Before addition to the whole milk protein concentrate mixture, the lactose monohydrate is first dissolved in 758 kg water at 35° and the maltodextrin in 93 kg water at 60°. In both cases dissolution is assisted by the use of a high shear high speed mixer.

641 kg of the whole milk, whey protein concentrate, lactose and maltodextrin mixture is heated to 40° in a vessel fitted with a high shear high speed mixer.

The vegetable oil mixture is heated to 70° and the glyceryl monostearate and lecithin dissolved therein. The oil vitamin concentrate is then added to the vegetable oil emulsifier blend and the whole is emulsified with the 641 kg of whole milk, whey protein, lactose and maltodextrin mixture by means of a high shear high speed mixer. The resulting emulsion is homogenised at a temperature of 45° and pressure of 70 bar and is then returned to the bulk mix of whole milk, whey protein, lactose and maltodextrin.

1309 kg water is added to the bulk misture which is then clarified, pasteurised at 78° for 15 seconds, homogenised at a temperature of 73° and a pressure of 200 bar and finally cooled to 3°.

To this chilled mixture is added 5 kg water soluble vitamin mixture, 4 kg calcium lactate pentahydrate, 2 kg calcium chloride dihydrate, 2 kg sodium hydroxide pellets, 193 g zinc sulphate heptahydrate and 13 g anhydrous copper sulphate.

Addition of the water soluble vitamins is effected by suspending in 62 kg water. The calcium lactate is suspended in 50 kg water; calcium chloride is dissolved in 3 kg water; sodium hydroxide is dissolved in 3 kg water; zinc sulphate is dissolved in 2 kg water; and the copper sulphate is dissolved in 0.8 kg water. Each of the vitamin/mineral ingredients solutions is added to the bulk standarised mix to give the final product, which has the composition shown in Table 7 below:

TABLE 7

|  | per 100 ml |
| --- | --- |
| Protein | 2.0 g |
| Casein | 0.77 g |
| Whey | 1.23 g |
| Fat[1] | 4.9 g |
| Carbohydrate | 7.0 g |
| Lactose | 6.0 g |
| Maltodextrin | 1.0 g |
| Calcium | 70 mg |
| Chloride | 60 mg |
| Copper | 120 μg |
| Iodine | 7 μg |
| Iron | 40 μg |
| Magnesium | 5 mg |
| Manganese | 3 μg |
| Phosphorus | 35 mg |
| Potassium | 65 mg |
| Sodium | 45 mg |
| Zinc | 1.0 mg |
| Vitamin A | 100 μg |
| Vitamin $B_1$ | 95 μg |
| Vitamin $B_2$ | 180 μg |
| Vitamin $B_6$ | 100 μg |
| Vitamin $B_{12}$ | 0.2 μg |
| Biotin | 2.0 μg |
| Folic acid | 50 μg |
| Niacinamide | 1.0 mg |
| Pantothenic acid | 500 μg |
| Vitamin C | 28 mg |
| Vitamin D | 8.0 μg |
| Vitamin E | 10 mg |
| Vitamin K | 7 μg |
| Carnitine | 1.0 mg |
| Taurine | 5.1 mg |
| Inositol[2] | 3.2 mg |
| Choline[2] | 5.6 mg |

TABLE 7-continued

| Energy | 80 Cals(334 kJ) |
| --- | --- |

[1]The fatty acid composition of this component is as follows:-

| Carbon chain length: double bonds | Range % w/w |
| --- | --- |
| $C_8:0$ | Trace–0.4 |
| $C_{10}:0$ | 0.5–1.1 |
| $C_{12}:0$ | 7.2–8.2 |
| $C_{14}:0$ | 4.7–5.4 |
| $C_{14}:1$ | 0.2–0.4 |
| $C_{15}:0$ | Trace–0.2 |
| $C_{16}:0$ | 14.4–15.5 |
| $C_{16}:1$ | 0.5–0.8 |
| $C_{17}:0$ | Trace–0.3 |
| $C_{18}:0$ | 6.8–8.0 |
| $C_{18}:1$ | 35.6–48.0 |
| $C_{18}:2$ | 11.1–20.5 |
| $C_{18}:3$ | 0.3–1.0 |
| $C_{20}:0$ | 0.6–1.1 |
| $C_{20}:1$ | 0.5–0.7 |
| $C_{22}:0$ | 1.4–1.8 |
| $C_{22}:1$ | Trace–0.6 |
| $C_{24}:0$ | 0.5–1.0 |

[2]Inositol and choline are contained in theprotein and carbohydrate ingredients but their presencemay be advantageous in avoiding the risk of the lowbirthweight infants developing deficiencies in thesesubstances.

We claim:

1. In an infant food for use in the feeding of low birthweight infants which is in the form of an artificial milk comprising sufficient protein, fat, carbohydrate, vitamins, minerals and trace elements to meet the nutritional requirements of the infant, the improvement which consisting essentially of incorporating a milk having an opacity greater than human breast milk which milk contains per 100 ml; from 160 to 300 μg of vitamin $B_2$, from 85 to 160 μg of vitamin $B_6$, from 20 to 60 mg of vitamin C, from 6 to 12 μg of vitamin D, from 8 to 16 mg of vitamin E, and from 40 to 150 μg of folic acid per 100 ml whereby the nutritional needs of said infants are met without imposing metabolic stress.

2. The improvement according to claim 1 wherein the milk contains per 100 ml at least one ingredient selected from the group consisting of at least 85 μg of copper; at least 820 μg of zinc; at least 2.5 mg of taurine; and at least 1 mg of carnitine.

3. The improvement according to claim 1 wherein the milk contains no added iron.

4. The improvement according to claim 1 wherein the milk contains per 100 ml at least one ingredient selected from the group consisting of from 85 to 160 μg of copper; from 820 to 1200 μg of zinc; about 40 μg of iron; from 2.5 to 10 mg of taurine; and from 1 to 5 mg of carnitine.

5. The improvement according to claim 4 wherein the milk contains from 80 to 160 μg of vitamin A, from 80 to 200 μg of vitamin $B_1$, from 0.1 to 0.7 μg of vitamin $B_{12}$, from 5 to 10 μg of vitamin K, from 0.8 to 2.0 mg of niacinamide, from 400 to 800 μg of pantothenic acid and from 1 to 4 μg of biotin per 100 ml.

6. The improvement according to claim 1 wherein the milk contains at least 80 μg of vitamin $B_1$, at least 820 μg of zinc, at least 85 μg of copper, at least 2.5 mg of taurine and at least 1 mg of carnitine per 100 ml.

7. The improvement according to claim 6 wherein the milk contains from 80 to 200 μg of vitamin $B_1$, from 820 to 1200 μg of zinc, from 85 to 160 μg of copper, from 2.5 to 10 mg of taurine and from 1 to 5 mg of carnitine per 100 ml.

8. An infant food according to claim 1 in the form of a sterilized liquid.

9. An infant food in the form of a concentrate which is adapted upon dilution with water to provide an artificial milk according to claim 1.

10. An infant food in solid form which is adapted upon addition of water to provide an artifical milk according to claim 1.

11. An infant food according to claim 10 in the form of a powder.

12. An infant food according to claim 1 wherein the pre-term infant has a birthweight of 1850 grams or less.

13. An infant food for use in the feeding of low birthweight infants which provide 65 to 85 kilocalories of energy and has an opacity greater than that of human breast milk which consisting essentially of 1.4 to 3.0 g of protein, 4.0 to 5.5 g of fat, 6.0 to 9.0 g of carbohydrate, 80 to 160 $\mu$g of vitamin A, 6 to 12 $\mu$g of vitamin D, 8 to 16 mg of vitamin E, 5 to 10 $\mu$g of vitamin K, 80 to 200 $\mu$g of vitamin $B_1$, 160 to 300 $\mu$g of vitamin $B_2$, 85 to 160 $\mu$g of vitamin $B_6$, 0.1 to 0.7 $\mu$g of vitamin $B_{12}$, 0.8 to 2.0 mg of niacinamide, 40 to 150 $\mu$g of folic acid, 400 to 800 $\mu$g pantothenic acid, 1 to 4 $\mu$g of biotin, 20 to 60 mg of vitamin C, 20 to 60 mg of sodium, 40 to 35 mg of chloride, 50 to 80 mg of calcium, 25 to 40 mg of phosphorus, 820 to 1200 $\mu$g of zinc, 85 to 160 $\mu$g of copper, 2.5 to 10.0 mg of taurine and 1 to 5 mg of carnitine per 100 ml whereby the nutritional needs of said infants are met without imposing metabolic stress.

14. An infant food according to claim 13 wherein the low birthweight infant weights 1850 grams or less.

15. An infant food for use in the feeding of low birthweight infants which provides 75 to 85 kilocalories of energy and has an opacity greater than that of human breast milk which consisting essentially of 1.7 to 2.2 g of protein 4.5 to 5.2 g of fat, 6.5 to 8.0 g of carbohydrate, 95 to 160 $\mu$g of vitamin A, 6 to 10 $\mu$g of vitamin D, 10 to 12 mg of vitamin E, 5 to 8 $\mu$g of vitamin K, 90 to 170 $\mu$g of vitamin $B_1$, 170 to 230 $\mu$g of vitamin $B_2$, 90 to 160 $\mu$g of vitamin $B_6$, 0.2 to 0.7 $\mu$g of vitamin $B_{12}$, 1.0 to 1.4 mg of niacinamide, 50 to 150 $\mu$g of folic acid, 2.0 to 4.0 $\mu$g of biotin, 20 to 40 mg of vitamin C, 25 to 50 mg of sodium, 45 to 65 mg of chloride, 55 to 80 mg of calcium, 27 to 40 mg of phosphorus, 900 to 1200 $\mu$g of zinc, 100 to 160 $\mu$g of copper, 4.0 to 10.0 mg of taurine, and 1 to 4 mg of carnitine per 100 ml whereby the nutritional needs of said infants are met without imposing metabolic stress.

16. An infant food according to claim 15 for use in the feeding of a low birthweight infant weighing 1850 grams or less.

17. A method of feeding a low birthweight infant comprising administering to an infant in need thereof an artificial milk consisting essentially of sufficient protein, fat, carbohydrate, vitamins, minerals and trace elements to meet the nutritional requirements of the infant, said artifical milk having an opacity greater than that of human breast milk and comprising per 100 ml, from 160 to 300 $\mu$g of vitamin $B_2$, from 85 to 160 $\mu$g of vitamin $B_6$, from 20 to 60 mg of vitamin C, from 6 to 12 $\mu$g of vitamin D, from 8 to 16 mg of vitamin E and from 40 to 150 $\mu$g of folic acid whereby the nutritional needs of said infant are met without imposing metabolic stress.

18. A method according to claim 17 wherein the infant food contains per 100 ml at least one ingredient selected from the group consisting of at least 85 $\mu$g of copper; at least 820 $\mu$g of zinc; at least 2.5 mg of taurine; and at least 1 mg of carnitine.

19. A method according to claim 17 wherein the milk contains no added iron.

20. A method according to claim 17 wherein the milk contains per 100 ml at least one ingredient selected from the group consisting of from 85 to 160 $\mu$g of copper; from 820 to 1200 $\mu$g of zinc; about 40 $\mu$g of iron; from 2.5 to 10 mg of taurine; and from 1 to 5 mg of carnitine.

21. A method according to claim 20 wherein the milk contains from 80 to 160 $\mu$g of vitamin A, from b 80 to 200 $\mu$g of vitamin $B_1$, from 0.1 to 0.7 $\mu$g of vitamin $B_{12}$, from 5 to 10 $\mu$g of vitamin K, from 0.8 to 2.0 mg of niacinamide, from 400 to 800 $\mu$g of pantothenic acid and from 1 to 4 $\mu$g of biotin per 100 ml.

22. A method according to claim 17 wherein the milk contains at least 80 $\mu$g of vitamin $B_1$, at least 820 $\mu$g of zinc, at least 85 $\mu$g of copper, at least 2.5 mg of taurine and at least 1 mg of carnitine per 100 ml.

23. A method according to claim 22 wherein the milk contains from 80 to 200 $\mu$g of vitamin $B_1$, from 820 to 1200 $\mu$g of zinc, from 85 to 160 $\mu$of copper, from 2.5 to 10 mg of taurine and from 1 to 5 mg of carnitine per 100 ml.

24. A method according to claim 17 in the form of a sterilized liquid.

25. A method according to claim 17 wherein the infant food is in the form of a concentrate which is adapted upon dilution with water to provide an artificial milk.

26. A method according to claim 17 wherein the infant food is in solid form which is adapted upon addition of water to provide an artificial milk.

27. A method according to claim 17 wherein the infant food is in the form of a powder.

28. A method according to claim 17 wherein the pre-term infant has a birthweight of 1850 grams or less.

29. A method for feeding a low birthweight infant comprising administering to an infant in need thereof an infant food which provides 65 to 85 kilocalories of energy and has an opacity greater than that of human breast milk which consisting essentially of 1.4 to 3.0 g of protein, 4.0 to 5.5 g of fat, 6.0 to 9.0 g of carbohydrate, 80 to 160 $\mu$g of vitamin A, 6 to 12 $\mu$g of vitamin D, 8 to 16 mg of vitamin E, 5 to 10 $\mu$g of vitamin K, 80 to 200 $\mu$g of vitamin $B_1$, 160 to 300 $\mu$g of vitamin $B_2$, 85 to 160 $\mu$g of vitamin $B_6$, 0.1 to 0.7 $\mu$g of vitamin $B_{12}$, 0.8 to 2.0 mg of niacinamide, 40 to 150 $\mu$g of folic acid, 400 to 800 $\mu$g of pantothenic acid, 1 to 4 $\mu$g of biotin, 20 to 60 mg of vitamin C, 20 to 60 mg of sodium, 40 to 35 mg of chloride, 50 to 80 mg of calcium, 25 to 40 mg of phosphorus, 820 to 1200 $\mu$g of zinc, 85 to 160 $\mu$g of copper, 2.5 to 10.0 mg of taurine and 1 to 5 mg of carnitine per 100 ml whereby the nutritional needs of said infant are met without imposing metabolic stress.

30. A method according to claim 29 wherein the low birthweight infant weights 1850 grams or less.

31. A method for feeding a low birthweight infant comprising administering to an infant in need thereof an infant food which provides 75 to 85 kilocalories of energy and has an opacity greater than that of human breast milk which consisting essentially of 1.7 to 2.2 g of protein, 4.5 to 5.2 g of fat, 6.5 to 8.0 g of carbohydrate, 95 to 160 $\mu$g of vitamin A, 6 to 10 $\mu$g of vitamin D, 10 to 12 mg of vitamin E, 5 to 8 $\mu$g of vitamin K, 90 to 170 $\mu$g of vitamin $B_1$, 170 to 230 $\mu$g of vitamin $B_2$, 90 to 160 $\mu$g of vitamin $B_6$, 0.2 to 0.7 $\mu$g of vitamin $B_{12}$, 1.0 to 1.4 mg of niacinamide, 50 to 150 $\mu$g of folic acid, 2.0 to 4.0 $\mu$g of biotin, 20 to 40 mg of vitamin C, 25 to 50 mg of sodium, 45 to 65 mg of chloride, 55 to 80 mg of calcium, 27 to 40 mg of phosphorus, 900 to 1200 $\mu$g of zinc, 100 to 160 $\mu$g of copper, 4.0 to 10.0 mg of taurine, and 1 to 4 mg of carnitine per 100 ml whereby the nutritional needs of said infant are met without imposing metabolic stress.

32. A method according to claim 31 for use in the feeding of a low birthweight infant weighing 1850 grams or less.

* * * * *